US008916834B2

(12) United States Patent
Lane

(10) Patent No.: US 8,916,834 B2
(45) Date of Patent: Dec. 23, 2014

(54) SPATIAL SEGREGATION OF PLASMA COMPONENTS

(71) Applicant: Glenn Lane Family Limited Liability Limited Partnership, Summerfield, FL (US)

(72) Inventor: Glenn E. Lane, Summerfield, FL (US)

(73) Assignee: Glenn Lane Family Limited Liability Limited Partnership, Summerfield, FL (US)

( * ) Notice: Subject to any disclaimer, the term of this patent is extended or adjusted under 35 U.S.C. 154(b) by 0 days.

(21) Appl. No.: 14/305,681

(22) Filed: Jun. 16, 2014

(65) Prior Publication Data

US 2014/0291545 A1 Oct. 2, 2014

Related U.S. Application Data

(63) Continuation of application No. 13/759,379, filed on Feb. 5, 2013, now Pat. No. 8,754,383, which is a continuation of application No. 13/075,138, filed on Mar. 29, 2011, now Pat. No. 8,368,033.

(60) Provisional application No. 61/318,436, filed on Mar. 29, 2010.

(51) Int. Cl.
*B01J 19/08* (2006.01)
*B03C 1/00* (2006.01)
*H01J 27/00* (2006.01)

(52) U.S. Cl.
CPC .................................... *H01J 27/00* (2013.01)
USPC .................. 250/423 R; 250/423 P; 250/424; 250/492.21; 505/213

(58) Field of Classification Search
USPC ................... 250/423 R, 423 P, 424; 505/213
See application file for complete search history.

(56) References Cited

U.S. PATENT DOCUMENTS

| | | | | | |
|---|---|---|---|---|---|
| 3,031,396 | A | | 4/1962 | Anderson | |
| 3,191,092 | A | * | 6/1965 | Baker et al. | 315/111.61 |
| 3,624,240 | A | * | 11/1971 | Damm et al. | 376/143 |
| 3,643,123 | A | * | 2/1972 | Haeff | 313/162 |
| 3,713,043 | A | | 1/1973 | Avivi et al. | |
| 3,939,354 | A | * | 2/1976 | Janes | 250/283 |
| 3,992,625 | A | * | 11/1976 | Schmidt et al. | 250/284 |
| 4,107,524 | A | * | 8/1978 | Book | 250/282 |
| 4,107,537 | A | * | 8/1978 | Forsen et al. | 250/423 P |
| 4,172,008 | A | * | 10/1979 | Fleet | 376/127 |
| 4,257,013 | A | * | 3/1981 | Pike et al. | 372/70 |
| 4,397,809 | A | * | 8/1983 | Salisbury | 376/107 |

(Continued)

*Primary Examiner* — David A Vanore
(74) *Attorney, Agent, or Firm* — Saliwanchik, Lloyd & Eisenschenk

(57) ABSTRACT

A closed plasma channel ("CPC") superconductor which, in a first embodiment, is comprised of an elongated, close-ended vacuum conduit comprising a cylindrical wall having a longitudinal axis and defining a transmission space for containing an ionized gas of vapor plasma (hereinafter "plasma components"), the plasma components being substantially separated into regionalized channels parallel to the longitudinal axis in response to a static magnetic field produced within the transmission space. Each channel is established along the entire length of the transmission space. At least one channel is established comprised primarily of free-electrons which provide a path of least resistance for the transmission of energy therethrough. Ionization is established and maintained by the photoelectric effect of a light source of suitable wavelength to produce the most conductive electrical transmission medium. Various embodiments of the subject method and apparatus are described including a hybrid system for the transmission of alternating current or, alternatively, multipole EM fields through the cylindrical wall and direct current or charged particles through the stratified channels.

18 Claims, 14 Drawing Sheets

(56) References Cited

U.S. PATENT DOCUMENTS

| | | | | | |
|---|---|---|---|---|---|
| 4,434,130 | A * | 2/1984 | Salisbury | 376/107 |
| 4,574,004 | A * | 3/1986 | Schmidt-Ott et al. | 95/79 |
| 4,636,287 | A * | 1/1987 | Pike et al. | 204/157.22 |
| 4,728,796 | A * | 3/1988 | Brown | 250/423 P |
| 4,859,973 | A * | 8/1989 | Leupold | 505/213 |
| H693 | H | 10/1989 | Leupold | |
| 4,893,103 | A * | 1/1990 | Leupold | 505/213 |
| 5,359,621 | A | 10/1994 | Tsunoda et al. | |
| 5,496,798 | A * | 3/1996 | Sakai et al. | 505/212 |
| 5,917,393 | A * | 6/1999 | Kupiszewski et al. | 335/216 |
| 5,981,955 | A * | 11/1999 | Wong et al. | 250/423 R |
| 6,258,216 | B1 * | 7/2001 | Ohkawa | 204/156 |
| 6,322,706 | B1 * | 11/2001 | Ohkawa | 210/695 |
| 6,398,920 | B1 * | 6/2002 | Ohkawa et al. | 204/156 |
| 6,489,610 | B1 * | 12/2002 | Barofsky et al. | 250/287 |
| 6,528,216 | B2 | 3/2003 | Park | |
| 6,572,778 | B2 | 6/2003 | Sterman et al. | |
| 6,585,891 | B1 * | 7/2003 | Ohkawa | 210/222 |
| 6,726,844 | B2 * | 4/2004 | Ohkawa et al. | 210/695 |
| 6,784,424 | B1 * | 8/2004 | Willoughby et al. | 250/292 |
| 6,803,590 | B2 | 10/2004 | Brailove et al. | |
| 7,095,019 | B1 * | 8/2006 | Sheehan et al. | 250/288 |
| 7,253,406 | B1 * | 8/2007 | Sheehan et al. | 250/288 |
| 7,312,444 | B1 * | 12/2007 | Willougbhy et al. | 250/293 |
| 7,541,558 | B2 | 6/2009 | Smith et al. | |
| 2004/0196127 | A1 | 10/2004 | Perrin | |
| 2006/0108931 | A1 | 5/2006 | Park et al. | |
| 2011/0266891 | A1 * | 11/2011 | Lane | 307/149 |
| 2011/0315867 | A1 * | 12/2011 | Lane | 250/282 |
| 2012/0104273 | A1 * | 5/2012 | Ryding et al. | 250/424 |

* cited by examiner

SPATIAL SEGREGATION OF PLASMA COMPONENTS

RELATED APPLICATIONS

This application is a continuation of U.S. Ser. No. 13/759,379, filed Feb. 5, 2013, which is a continuation of U.S. Ser. No. 13/075,138, filed Mar. 29, 2011, which claims the benefit of U.S. Provisional Application No. 61/318,436, filed Mar. 29, 2010 and entitled, Spatial Segregation of Plasma Components, all of which are hereby incorporated by reference herein in their entirety, including any figures, tables, or drawings.

FIELD OF THE INVENTION

The present invention relates generally to the transmission of charged particles through a closed plasma channel ("CPC") superconductor, and more particularly to a method and apparatus for regionally segregating the components of an ionized or partially ionized medium within an elongated ionization chamber according to their charge and/or mass to produce a low resistance or no-resistance conductive path for the transmission of energy. The apparatus has multiple applications and may also be described as a low energy particle accelerator.

BACKGROUND OF THE INVENTION

The demand for electrical energy in the contiguous US was 746,470 MegaWatts in 2005. Most of the energy was produced by coal (49.7%), nuclear energy (19.3%), and natural gas (18.7%). Unfortunately, transmission of energy from the point of generation to the point of retail sale remains highly inefficient. Energy losses of between 5-8% in 2005 translate to nearly twenty billion ($20,000,000,000) Dollars in lost revenues. Nearly all the energy produced passes through high voltage power lines which is then delivered to cities, businesses, and residential areas after being stepped down to lower voltages.

All high voltage power lines use insulated copper wiring due to its relatively cheap cost and electrical resistivity of $17.2\times10^{-5}$ Ωm, which is good for metals. While these cables allow over 700,000 volt electricity transmission, power lines using copper have serious shortcomings and limitations due to mechanical and electrical constraints of hanging wires. For instance, transmission of electricity through copper cables is incredibly inefficient, with a tremendous amount of energy lost in the form of heat created by resistance of electricity passing through the cable. Moreover, the heat generated can cause deformation and failure of the transmission lines, particularly if they are too long. Other problems include costly rights of way which must be obtained to ensure use of the land for towers which, like the cables suspended therefrom, present aesthetic drawbacks.

Underground cables have several advantages over suspended power cables including longer transmission distances, higher electric loads, reduced right of way property costs and no aesthetic disturbance. Buried copper lines also support minimal weight and have better dielectric insulative coatings which reduce dielectric losses of electricity as compared with hanging lines. However, efficiency loss resulting from resistance is still a major problem. Cryogenic cables are a second underground transmission line option, but require liquid nitrogen stations to remain cooled in conjunction with the other costs. Superconductor power transmission lines are an attractive solution because they would exhibit zero loss due to no electrical resistivity, however processing of the single crystal material into wires of any useful length remains impracticable if not impossible.

Clearly there exists a longstanding need for a more efficient means of transmitting energy over long distances. In order to meet the need in the art, a method and apparatus for power transmission through a confined plasma subjected to a magnetic and/or electromagnetic field is provided.

It is known that glass tubes with electrodes at each end and filled with a noble gas can transmit electricity. These gas tubes are similar to neon tubes when an external electric field is applied. Plasma forms inside the tube under an alternating current electric field of high voltage which ionizes the gas or a portion thereof. Electrons become freed from the parent gas molecules and electrical conductivity is increased relative to that of the gas before the applied electric field. These electrons behave similar to the free electrons in a metal such as copper.

Even a partially ionized gas in which as little as 1% of the particles are ionized can have the characteristics of a plasma (i.e. response to magnetic fields and high electrical conductivity). The term "plasma density" usually refers to the "electron density", that is, the number of free electrons per unit volume. The degree of ionization of a plasma is the proportion of atoms which have lost (or gained) electrons, and is controlled mostly by the temperature. A plasma is sometimes referred to as being "hot" if it is nearly fully ionized, or "cold" if only a small fraction (for example 1%) of the gas molecules are ionized. "Technological plasmas" are usually cold in this sense. Even in a "cold" plasma the electron temperature is still typically several thousand degrees Celsius.

The electrical conductivity of plasmas is related to its density. More specifically, in a partially ionized plasma, the electrical conductivity is proportional to the electron density and inversely proportional to the neutral gas density. Put another way, any portion of the gas medium that is not ionized, of that exists by virtue of recombination of its charged particles, will continue to act as an insulator, creating resistance to the transmission of electricity therethrough. The subject invention exploits a plasma's responsiveness to magnetic fields (as well as that of the paramagnetic gas medium) to substantially or entirely obviate this resistance during energy transmission in a manner more fully described herein. Accordingly, the transmission efficiency will be substantially independent of distance but rather a function of 1) ionization 2) vacuum quality 3) magnetic field stratification. Ionization would be optimum photo-electric ionization maintained by UV light saturation; vacuum quality would be high to extremely high, with the determining factor being the MFP (mean free path) of the non-ionized molecules present; magnetic field stratification would be the effect of the static magnetic field to regionalize the non-participating molecules and particles within the chamber.

SUMMARY OF THE INVENTION

The present invention may be characterized as a closed plasma channel ("CPC") superconductor, or as a boson energy transmission apparatus. In a first preferred embodiment, the apparatus is comprised of an ionization chamber (also referred to herein in some embodiments as a "plasma separation chamber") comprising an ionization vessel (also referred to herein in some embodiments as a "plasma separation vessel") having an ionization space (also referred to herein in some embodiments as a "plasma separation space"), and photoionization means operably associated with the ionization space for ionizing a plasma precursor gas or vapor confined therein under vacuum into a plasma comprised of ions, electrons and non-ionized gas or vapor (hereinafter "plasma components"). Preferably, the plasma precursor gas or vapor is paramagnetic. Ionization is established and maintained by the photoelectric effect of a light source of suitable wavelength to produce the most conductive transmission medium.

In a second preferred embodiment, plasma may be charged to the above-described vessel rather than created within the vessel itself. In either instance, magnetic field producing means are employed to produce an axially homogeneous static magnetic field within the transmission space to substantially separate the plasma components into "regions" or "channels" located parallel to the central longitudinal axis of the vessel. Each channel is established along the entire length of the ionization space. At least one channel is established comprised primarily of free-electrons which, in one application of the subject invention, provide a path of least resistance for the transmission of electricity therethrough. In other embodiments, an oscillating magnetic field (an electromagnetic field or "perturbing field") is introduced within the transmission space to stimulate movement of charged particles through the conduit. Various additional embodiments of the subject method and apparatus are described including a hybrid system for the transmission of alternating current or, alternatively, multi-pole EM fields through the cylindrical wall and direct current or charged particles through at least one of the regionalized channels and this process can serve as a superconductor, a low energy particle accelerator, as well as other applications. In all embodiments, the aforementioned photoionization means may be employed to sustain the plasma (i.e., prevent recombination of its components). Methods of enhancing efficiency of transmission of charged particles through the transmission space are described.

Plasma components of varying compositions and densities that have a magnetic or paramagnetic quality will react with a discrete magnetic polarity within the transmission space into substantially separate regions or "gradations" ordered by conducting to insulating properties, the mass/charge ratio of each component lending itself to either a greater of lesser response to the static magnetic field. The location of the conducting region or gradation can thereby be manipulated using different magnetic field producing means, including one embodiment where the conducting layer is primarily at the center of the field and another where it is primarily oriented along the interior wall surface of the conduit.

In those embodiments wherein the conducting channel is at the center of the field, an electromagnetic (EM) field, say alternating current or any multipole field, can be applied. In this instance, the EM field is referred to as the "perturbation field" along the wall of the conduit and the first magnetic field as the "stratum field" focusing the conducting channel towards the center. While this second EM field may work to perturb the stratum of the original field, its influence will be refined to attract and repel the charged particles (i.e. DC current) or pull-push in such a way as to accelerate or enhance the flow to receiving means located at the retrieval end of the conduit. The wall charge will also be retrieved by the same or additional receiving means located at the receiving end. Further embodiments can use the same principles in different combinations for different purposes.

Another important aspect of the invention, is the use of photoionization within the conduit. The plasma medium will be sustained at maximum conductivity levels with light levels and wavelength qualities seen in nature where plasma is the most abundant state and a bosonic energy carrier. Plasma densities, in the subject apparatus and methods, are relatively sparse as compared with other applications in the field of magnetohydrodynamics (MHD) to reduce the resistivity of kinetic effects. The plasma state that is sustained in the subject conduit is more akin to a space plasma than it is to a fusion plasma. The subject apparatus and methods are designed to mimic the natural state of plasma which prevails outside the earth's atmosphere, in "space," which is proven to be an efficient energy transmission medium over vast distances. In order to achieve that the CPC is going to require vacuum qualities that are high to extremely high. The determining factor is the "mean free path" (MFP) of the foreign molecules in the chamber. The MFP has to be long enough to overcome resistance that would be caused by collisions interfering with the path of the charge, aided by the static magnetic field drawing interfering molecules away.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 10A and 10B show two states during an AC cycle. FIGS. 10A, 10B illustrate a quadrupole ion trap (Paul trap), where the charged particle (center) is being pulled horizontally and then pushed vertically by the cycles of the electric field. (In this diagram the charged particle is positive, but could alternatively be negative). Here the speckled areas surrounding the particle in the diagram make it obvious that certain actions or reactions are exerted on the particles by virtue of the oscillations of the Quadrupole trap. If you follow the depiction of the charged particle (center) and surrounding speckled area, let's allow for the sake of our discussion, that what we are seeing is the particles are being pushed and then pulled during the cycles of the quadrupole field;

FIG. 16 is a first embodiment of the CPC wherein the UV light is introduced into the chamber through one-way glass in the walls. Herein the interior walls of the CPC are highly reflective and the portals of UV light aimed at each other with a curved geometry that allows for, in further embodiments, either a standing wave or multiplier effect or both. Whatever type of optimization is used, the constant is the use of the photo-electric effect of light of a certain wavelength within the CPC. The photoelectric effect is fundamental to this invention. While light of varying wavelength could be utilized, those in the UV spectrum are preferred. A filament or fiber optic material is used to feed the light to each of the portal through one way glass creating standing waves of UV light across tubular reflections instead of flat surface reflections.

FIG. 17 is a second embodiment of a conduit comprising a vacuum chamber filled with low-density gas. Intense UV light is introduced into the reflective tube (shown at right of Figure) to create a circular standing wave. This embodiment illustrates a UV multiplier; each introduction of UV light is aimed in sequence to the next to form a standing wave that is multiplied by the combined effect. Alternating current "AC" is input into the conduit wall (at left) and travels end-to-end as poly-phase ribbons. The letter "A" means attract DC charge, "R" means repel DC charge and "G" refers to the gap that is induced during oscillations.

FIG. 18 illustrates a third embodiment of the subject conduit with UV light introduced therein. The magnetic field is in opposition to recombined or non-ionized molecules. Direct Current (DC) has a clear path on the chamber walls, adjacent to their conductive metal surface protected with a permeable membrane that allows current flow between gas and solid conductors. Two UV light helix multipliers are illustrated to create a double helix, one of which is a "return helix". The charged particles P are indicated by the arrows adjacent the walls of the conduit. Alternating Current (AC) is optionally passed through the conduit wall.

Figure 16:
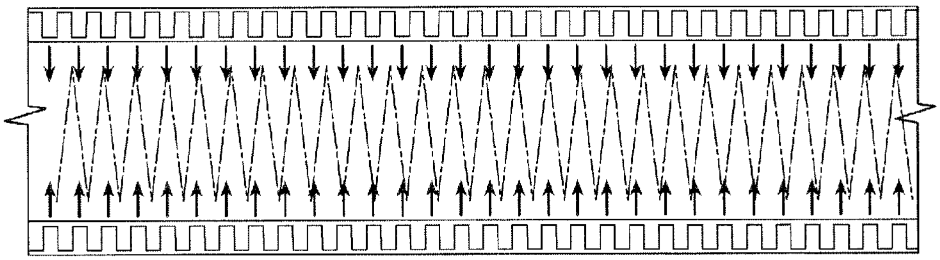
FIGS. 16, 17 and 18 all depict iterations of the subject invention, particularly in connection with the introduction of UV light into the conduit.
Figure 17:
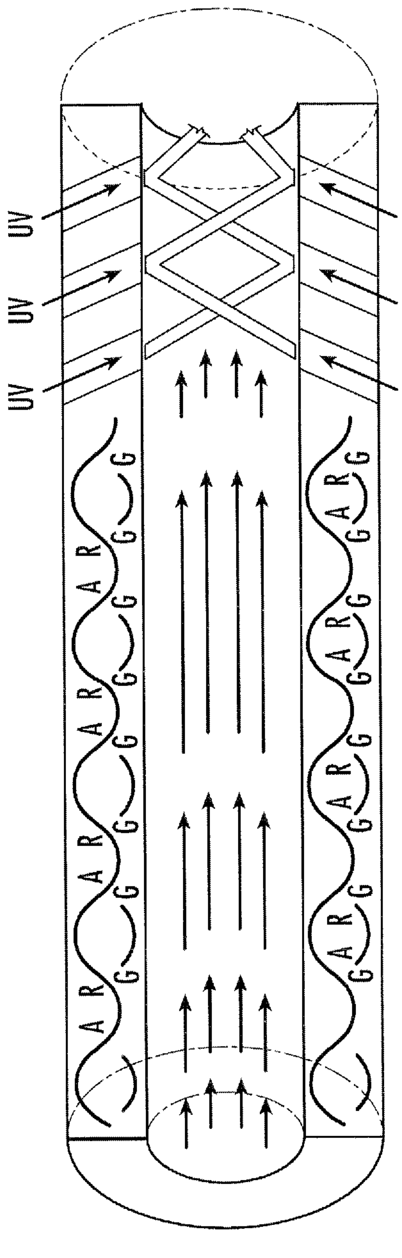
Figure 18:
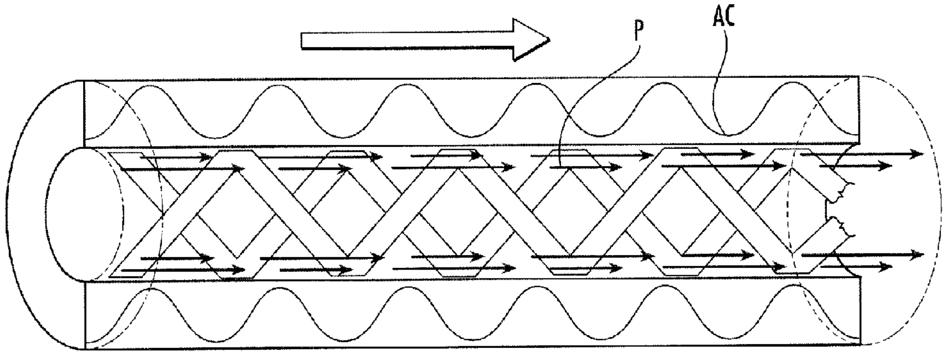

The conduits shown in FIGS. 16, 17 and 18 have a highly reflective interior surface. UV light is introduced throughout. In these iterations, UV light enters the conduit through a number of one way mirrored portals and is aimed from portal to portal to establish a standing wave matrix. While the inventor is working on another method, to be the subject of a subsequent patent application, the method described herein is applicable to the current application. Photoionization of various plasma mediums is at the crux of this submittal.

Figure 19:
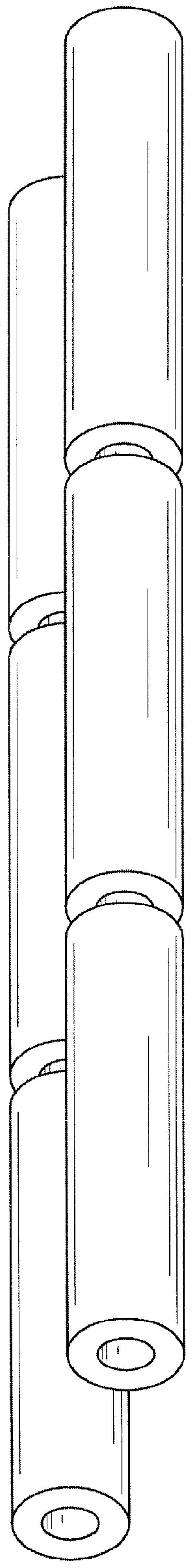

FIG. 19 illustrates a pair of conduits comprised of a plurality of conduits sections connected in series.

Figure 20:
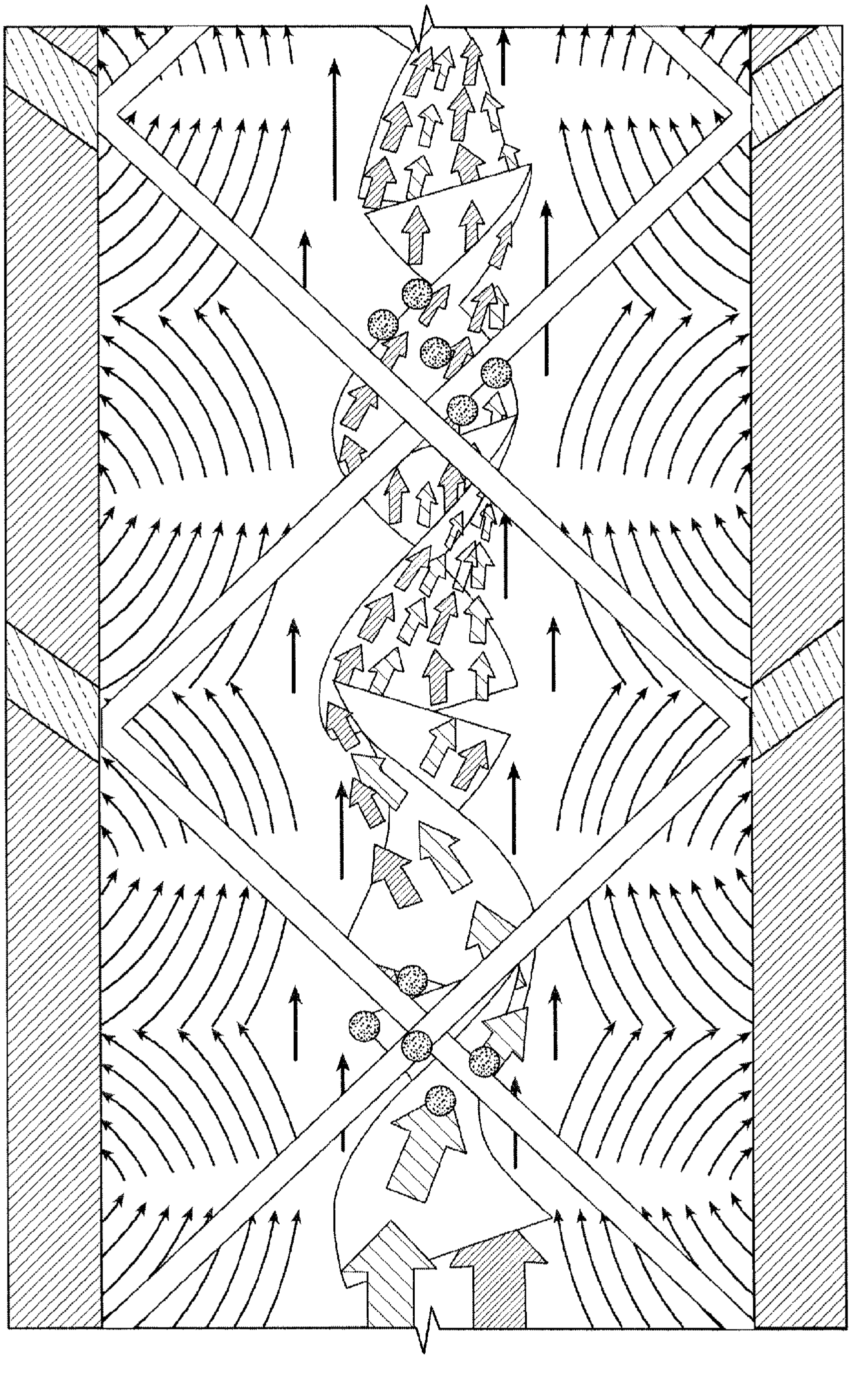

FIG. 20 depicts the portals that introduce ionizing light into the ionization space for reflection off the reflective wall surface thereof.

DETAILED DESCRIPTION OF THE PREFERRED EMBODIMENT

At the outset, it should be clearly understood that like reference numerals are intended to identify the same structural elements, portions or surfaced consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. Components are not drawn to scale or proportion. As used in the following description, the terms "horizontal" and "vertical" simply refer to the orientation of an object relative to level ground, and the terms "left", "right", "top" and "bottom", "up" and "down", as well as adjectival and adverbial derivatives thereof (e.g., "rightwardly", "upwardly", etc.), simply refer to the orientation of a surface relative to its axis of elongation, or axis of rotation as appropriate.

Generally, the subject invention is a method and apparatus for the creation of a preferably low density plasma within a confined space via photoionization of a plasma precursor gas or vapor under vacuum. Additional embodiments relate to the separation and spatial segregation of the plasma components within the enclosure to form at least one highly conductive region of free electrons for the transmission of energy therethrough. The electron conductive region or "path" has low resistance relative to the non-separated plasma and to the other plasma constituents.

Figure 1:
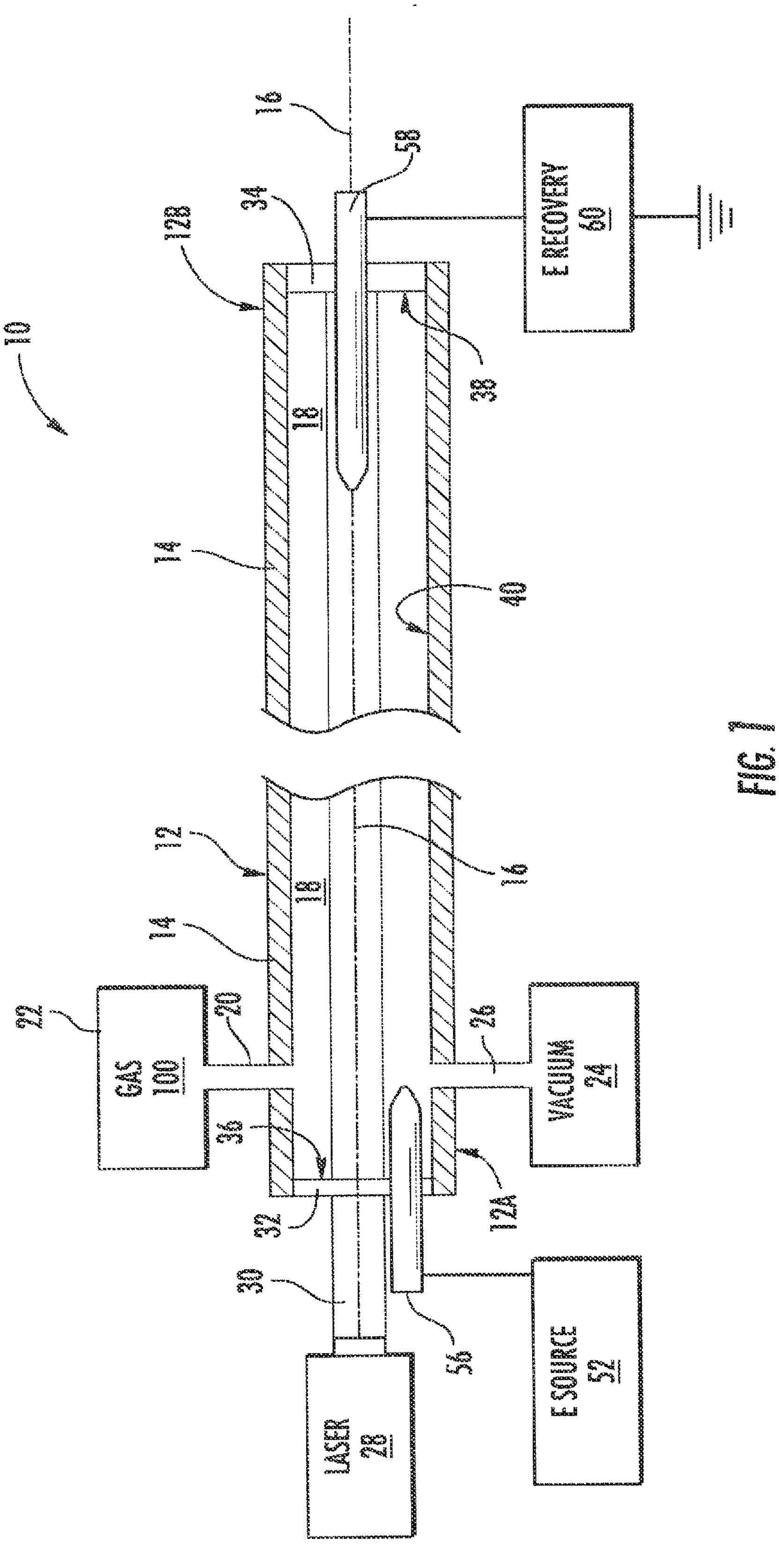
FIG. 1 is a side sectional schematic view of a preferred embodiment of the closed plasma channel apparatus of the subject invention.

With reference first being made to FIG. 1, there is illustrated a side sectional schematic view of the subject closed plasma channel apparatus (hereinafter sometimes also referred to more simply as the "subject apparatus"), designated generally by reference numeral 10. A first primary component of apparatus 10 is an ionization chamber 12 (also referred to herein in some embodiments as a "plasma separation chamber") comprising an ionization vessel (also referred to herein in some embodiments as a "plasma separation vessel") having an ionization space (also referred to herein in some embodiments as a "plasma separation space"). In a preferred embodiment, ionization chamber 12 is comprised of a semi-flexible, elongated vacuum conduit having a first end portion 12A and second end portion 12B, the conduit comprising a hollow cylindrical wall 14 having a longitudinal axis 16 and defining a transmission space 18 for containing a plasma precursor gas or vapor 100 supplied via inlet 20 from storage container 22. The terms "chamber" and "conduit" are hereinafter used interchangeably unless specifically distinguished. A vacuum system 24 is operably attached to conduit 12 for the evacuation of air from transmission space 18 through outlet 26 disposed through wall 14. Conduit 12 may be constructed of a plurality of separate parts which are coupled together to define transmission space 18, or may be of unibody construction. The cross-sectional shape of conduit 12 and transmission space 14 may be round, oval, polygonal or otherwise and is selected based on the efficiency with which energy is transmitted through the system as determined through experimentation. 3721

Ionization means are provided for ionizing plasma precursor gas 100 inside conduit 12. It should be immediately recognized, however, that ionization of plasma precursor gas 100 may also be carried out in a separate chamber and then transferred into transmission space 18. Notwithstanding this option, ionization within conduit 12 is preferred to cope with recombination of charged particles on an ongoing basis. It is expected that there may be some recombination back to the gas or vapor state which is undesirable; plasma precursor gases universally conform to the Bose Einstein principle of being a conductor in the ion state and an insulator in the gas state. Ionization by means of ultra-violet light, X-rays, radioactive rays, glowing metals, burning gas, and electronic collision are all contemplated although the former means is preferred.

It is recognized that a laser beam of suitable wavelength can penetrate and ionize a gas or vapor medium over great distances. Accordingly, an ionizing beam emitting means 28 is provided for emitting ionizing beam 30 ("laser beam") into transmission space 18 which has been charged with plasma precursor gas 100. The term "ionizing beam emitting means" as used herein includes not only presently known lasers and laser diodes, but also other light sources of high steradiancy which will excite ionization in a medium. Lasers utilize the natural oscillations of atoms or molecules between energy levels for generating a beam of highly amplified and coherent electromagnetic radiation of one or more discrete frequencies. The laser means used to ionize plasma precursor gas 100 should be selected with regard to energy, pulsewidth and wavelength. Transmission space 18 must be clean, dry and scrubbed of any catalytic agents or impurities that would impede full ionization of plasma precursor gas 100.

A parcel mirror 32 is mounted across the opening of first end portion 12A of conduit 12 and solid reflective mirror 34 is mounted across the opening of the opposite end portion 12B. Parcel mirror 32 and solid mirror 34 have reflective surfaces 36 and 38, respectively, facing transmission space 18. Parcel mirror 32 permits the passage of ionizing beam 30 generated by ionizing beam emitting means 28 into transmission space 18 conduit 12, but does not allow light to pass in the opposite direction, instead reflecting it back into reaction space 18. Reflection of ionizing beam 30 within transmission space 18 promotes uniform photoionization of plasma precursor gas 100.

In order to ensure uniform photoionization of plasma precursor gas 100 throughout transmission space 18 the inside surface 40 of wall 14 must be highly efficient in reflecting light particularly short wave light in the UV ranges. Alternatively, optical cavity or optical resonator technology may be employed and is comprised of an arrangement of mirrors that form a standing wave cavity resonator for light waves. Optical cavities are a major component of lasers, surrounding the gain medium and providing feedback of the laser light. Light confined in the cavity reflect multiple times producing standing waves for certain resonance frequencies.

Once the plasma precursor gas 100 is ionized to achieve the desired plasma density, the plasma components are substantially separated into regionalized channels running parallel to longitudinal axis 16 in response to a magnetic field applied within transmission space 18. Each channel is comprised primarily of a single plasma component (i.e., electron, ion or neutral particle) and is established along the entire length of transmission space 18, from first end portion 12A to second end portion 12B. One channel is comprised primarily of free-electrons (an "electron channel" or "electron path") and provides a path of least resistance for the transmission of energy therethrough. Several embodiments of magnetic field producing means are described below. Generally, a homogenous axial magnetic field is first established throughout the transmission space containing the ionized gas to separate the plasma into its ion, electron and neutral particle component parts, each component type occupying a substantially separate region parallel to longitudinal axis 16, each region having a different degree of conductivity. This process may be referred to as "stratification" of the plasma.

Figure 2:
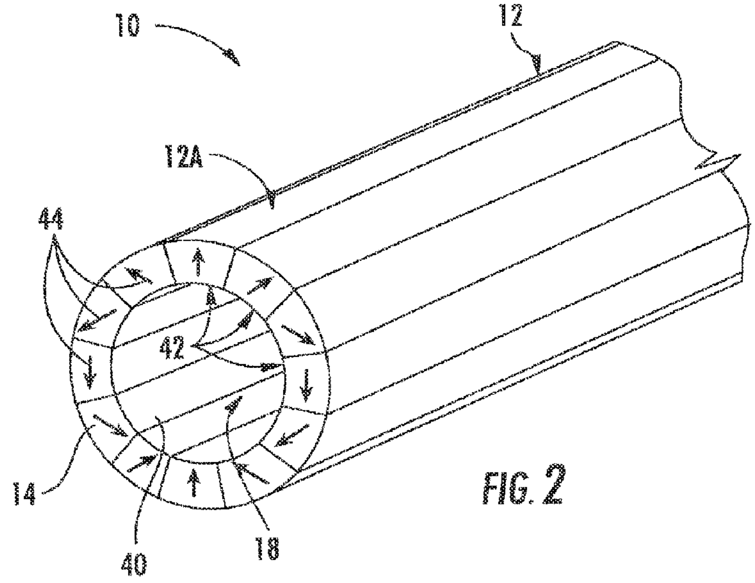
FIG. 2 is perspective view of a first embodiment of a conduit of the subject CPC apparatus having a Halbach cylinder configuration of the K=2 variety.
Figure 3:
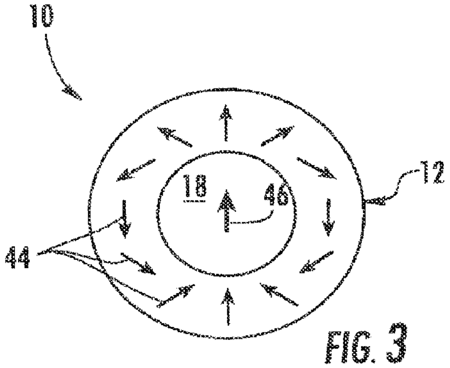
FIG. 3 is a cross sectional view of the conduit of FIG. 2 illustrating the magnetic flux within the transmission space of the conduit which is responsible for segregation of plasma components.
Figure 4:
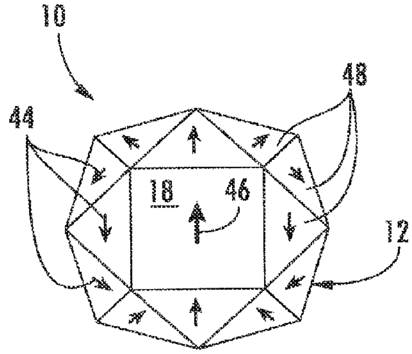
FIG. 4 is a cross sectional view of a an alternate K=2 configuration.
Figure 5:
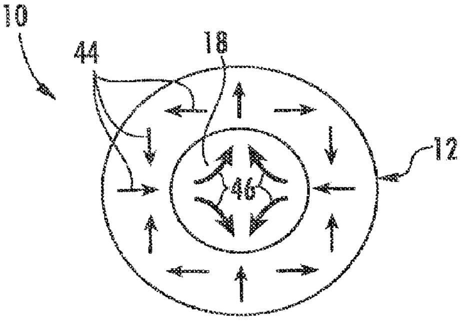
FIG. 5 is a cross sectional view of a conduit of the subject CPC apparatus having a Halbach cylinder configuration of the K=3 variety.
Figure 6:
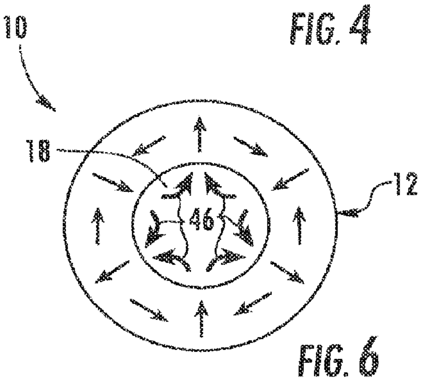
FIG. 6 is a cross sectional view of a conduit of the subject CPC apparatus having a Halbach cylinder configuration of the K=4 variety.
Figure 7:
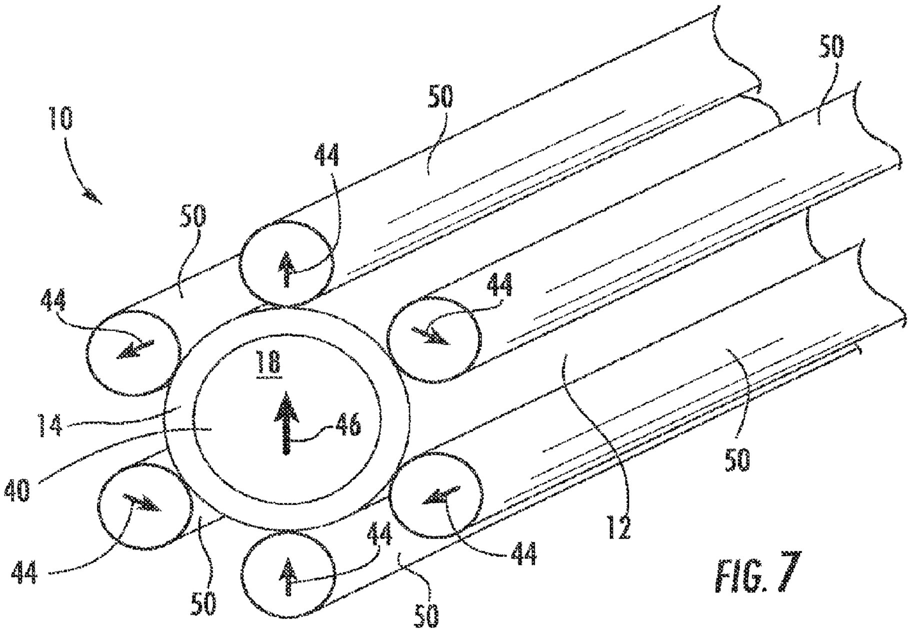
FIG. 7 is a cross sectional view of a second embodiment of a conduit of the subject CPC apparatus having magnetic field producing means external to the conduit.

Referring to FIG. 2, in a first embodiment, a magnetic field is created within transmission space 18 by conduit 12 itself, the cylindrical wall 14 of which is composed of an array of magnetic segments 42 with varying directions of magnetization 44 (i.e., a "Halbach cylinder") which produce a magnetic flux confined to the transmission space 18 of conduit 12. Those skilled in the art will recognize that the ratio of outer to inner radii of conduit 12 plays a critical role achieving the desired magnetic flux within transmission space 18, as does the number and direction of magnetization of each magnetized segment 42. Referring to FIG. 3, it may be observed that the direction of the magnetic field produced by a cylinder of the K=2 variety is uniformly bottom to top (transversely upward), as indicated by vector field arrow 46. A K–2 Halbach arrangement produces a uniform magnetic field. A variation of this arrangement is illustrated in FIG. 4 in which plurality of permanent magnets shaped into wedges 48 are organized into the desired hollow conduit 12. This arrangement, proposed by Abel and Jensen, also provides a uniform field within transmission space 18. The direction of magnetization of each wedge 48 is calculated using a set of rules given by Abele, and allows for great freedom in the shape of wall 14 and transmission space 18. Embodiments with non-uniform magnetic fields are illustrated in FIGS. 5 and 6. Note that by varying the directions of magnetization 44 into different patterns the magnetic flux within transmission space 18 becomes more complex, as evidenced by vector field arrows 46. Such arrangements accordingly produce more complex arrangements of channels including, for instance, more than one channel of the same plasma component. Accordingly, more than one electron path may be generated within a single transmission space 18 with these arrangements.

In another design variation known as a "magnetic mangle", the magnetic field producing means is external to conduit 12 and in one embodiment is comprised of a plurality of uniformly magnetized rods 50 incrementally spaced around the circumference of conduit 12, parallel to its longitudinal axis 16. The rods possess different cross-sectional directions of magnetization 44 relative to one another to mimic the field producing effects of Halbach cylinders. As may be observed, the arrangement illustrated is closely related to the k=2 Halbach cylinder of FIGS. 2 and 3. Rotating rods 50 relative to each other results in many possibilities including a dynamically variable field and various dipolar configurations. Embodiments that provide magnetic field producing means external to conduit 12 have the advantage of permitting the conduit to be made of conductive or non-conductive materials. Semi-rigid polymers, ceramics and glass are contemplated.

In yet another embodiment, electromagnetic field producing means external to the conduit is comprised of at least one electromagnet arranged to impart an electromagnetic field within transmission space 18 for the segregation of plasma components into the desired longitudinal channels. A quadrupole electromagnet is illustrative but may not be ideal for conduits of lengths suitable for long distance power transmission.

Figure 8:
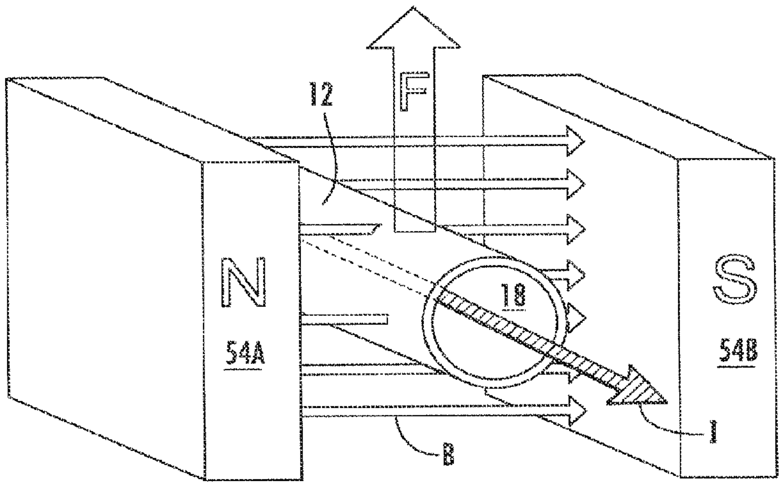
FIG. 8 is a schematic illustration of an electromagnetic force created within the transmission space of the subject conduit.
Figure 9:
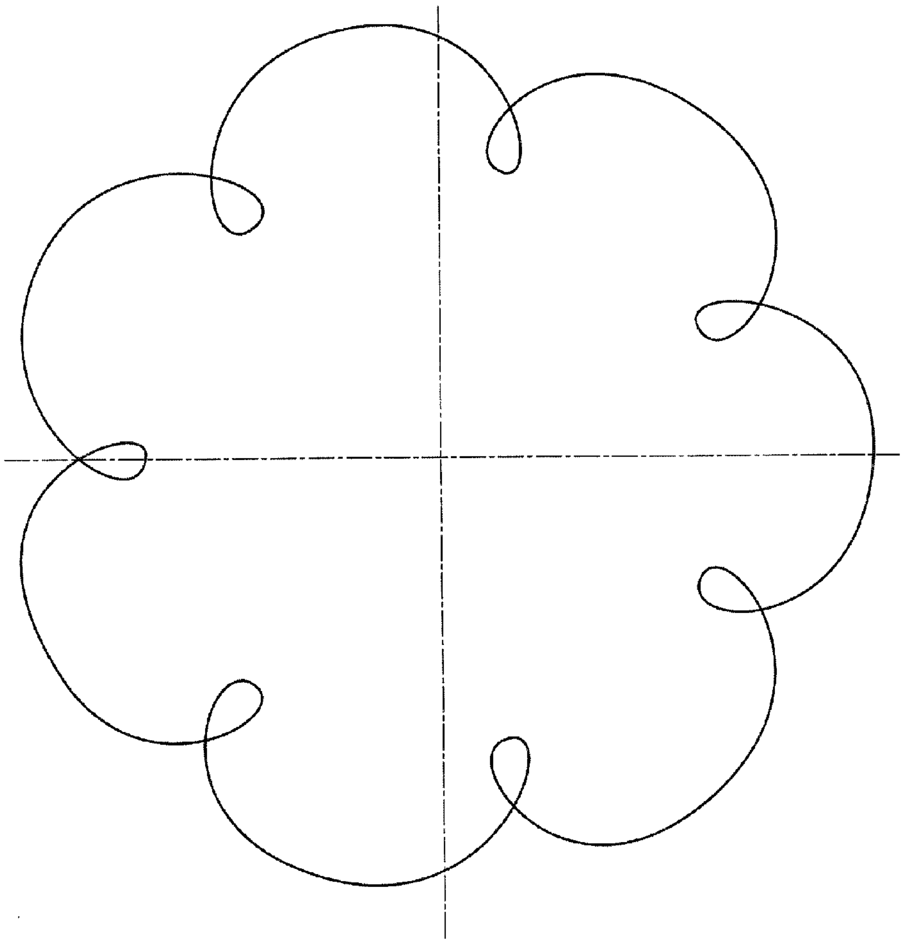
FIG. 9 (IE1) is an illustration of the epitrochoid motion of an ion radially bound by a magnetic and oscillating electric field. This is a classical trajectory in the radial plane for $w_{+}/w_{-}=8$. This diagram illustrates the trajectory of an ion under the influences of the charges manipulating the ion's movement within the Penning trap. Wiki explains the diagram, "Penning traps use a strong homogeneous axial magnetic field to confine particles radially and a quadrupole electric field to confine the particles axially." For the sake of our discussion, let's allow the word static to be substituted for "homogeneous" in the preceding sentence. Also, let's allow that a quadrupole field is non-static or an oscillating field. Additionally, for discussions herein we sometimes refer to a static field as a stratum field or refer to an oscillating field as a perturbation field.
Figure 10B:
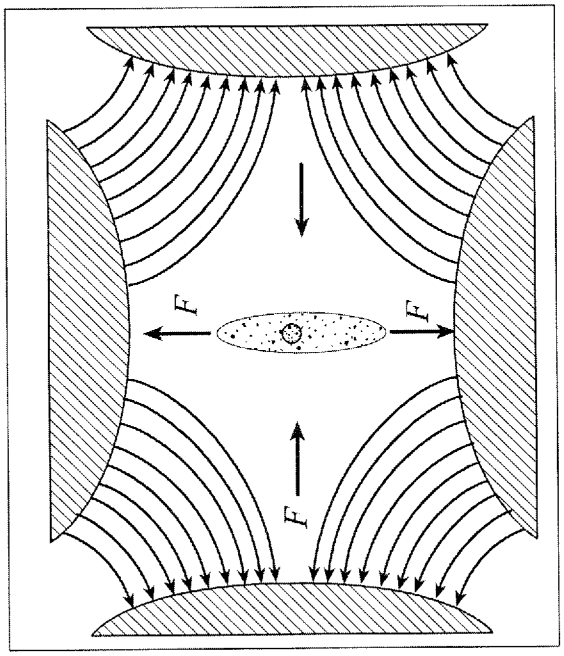
FIGS. 10A and 10B depict a scheme of a Quadrupole ion trap of classical setup with a particle of positive charge (center, dot), surrounded by a cloud of similarly charged particles (speckled area). The electric field E (curved lines) is generated by a quadrupole of endcaps (top and bottom, positive) and a ring electrode (sides).
Figure 10A:
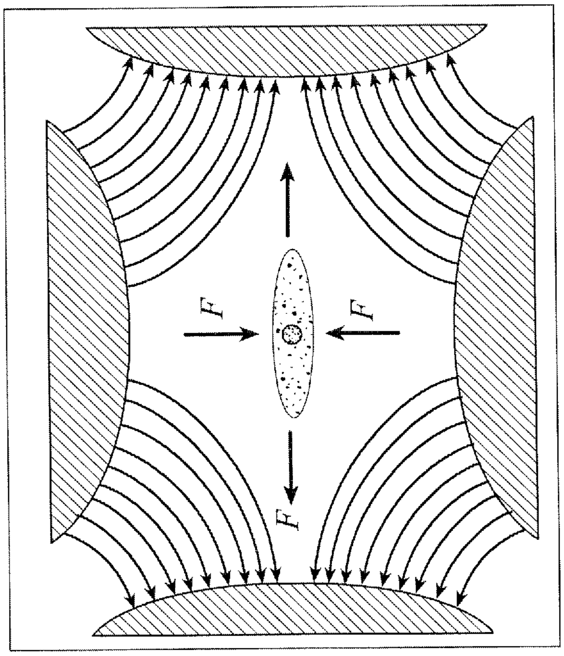
Figure 11:
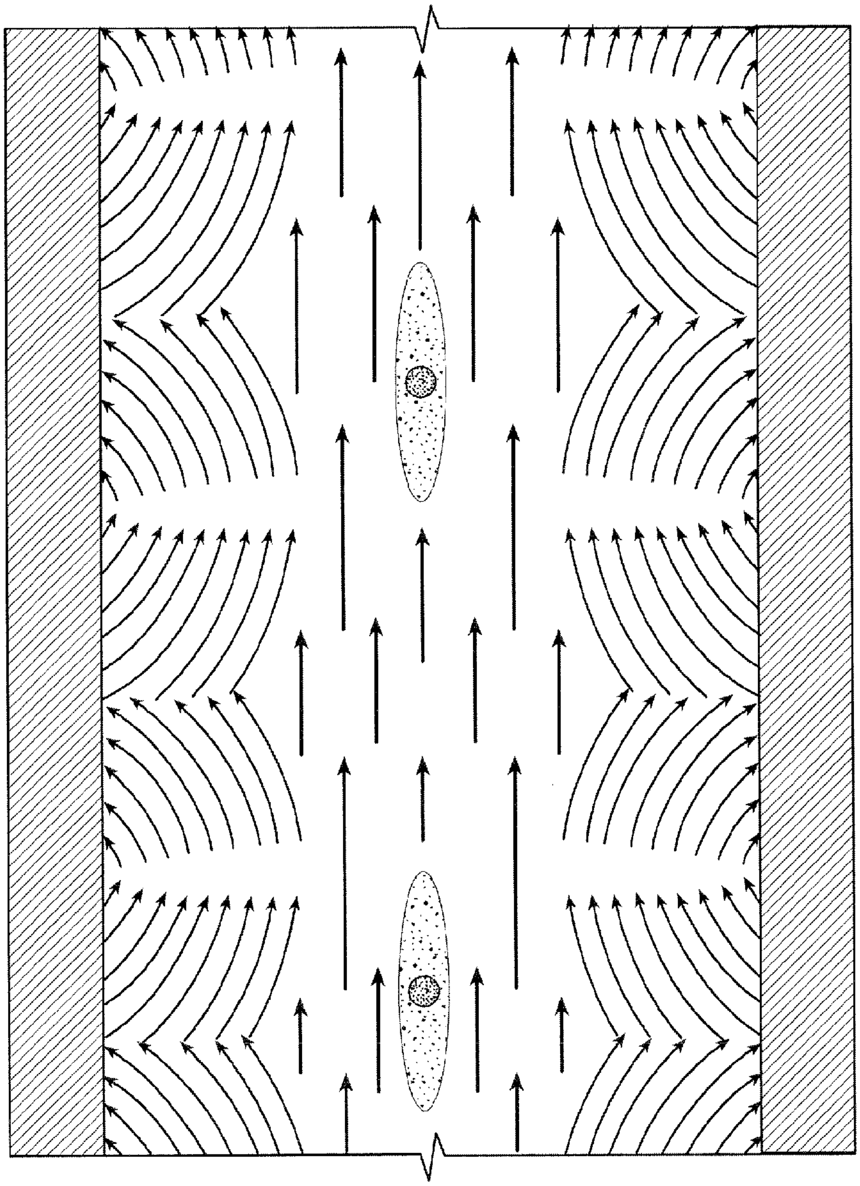
FIG. 11 illustrates a linear expansion of the quadrupole field of FIG. 10, where the cycles of the electric field both pull and then push the charged particles therethrough. Hence, they are not being trapped but driven through our CPC medium.
Figure 12A:
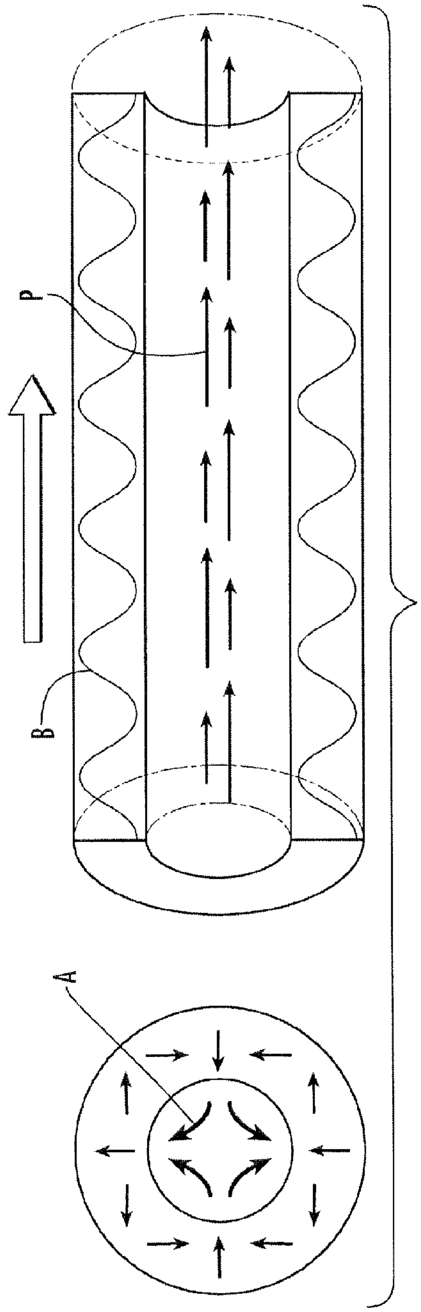
FIGS. 12A and 12B identify the magnetic field, which is homogenous, (stratum field) as "A" and the electric field (perturbation field) as "B". A+B=acceleration. The electric field can be multi-pole (i.e. quadrupole) to facilitate movement of the charge. The Halbach array is a delightful method of magnetic field management within the CPC because it permits so many options to manage both the medium and subject charges. The magnetic configuration of the Halbach array is determined by the plasma medium involved. In one embodiment (FIG. 12A) it is employed to focus the charged particles "P" to move near the center of the CPC. In another embodiment (FIG. 12B) you can move the charges "P" along the wall of the CPC. Further, you can use the Halbach array as the static magnetic field and the quadrupole as the oscillating magnetic field.
Figure 12B:
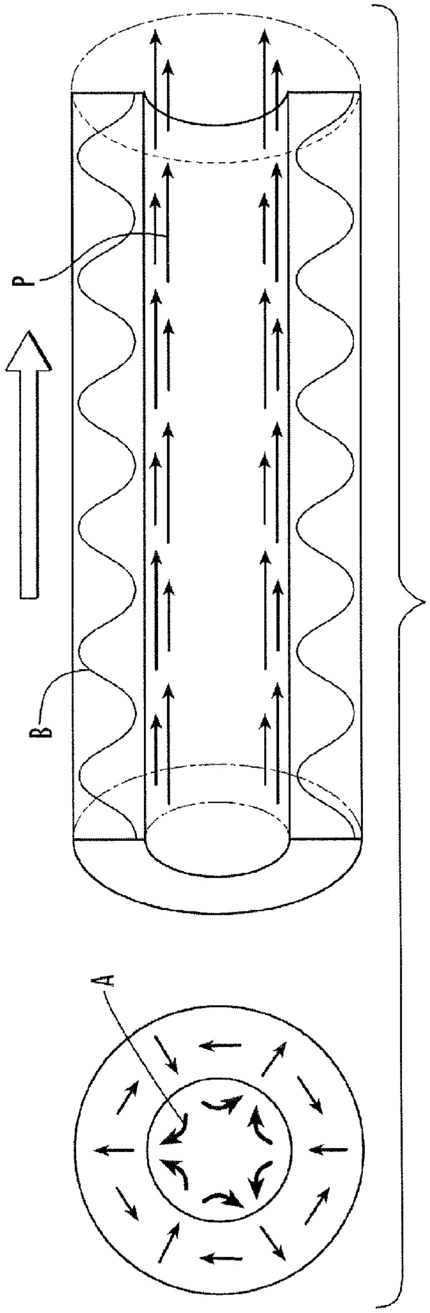
Figure 13:
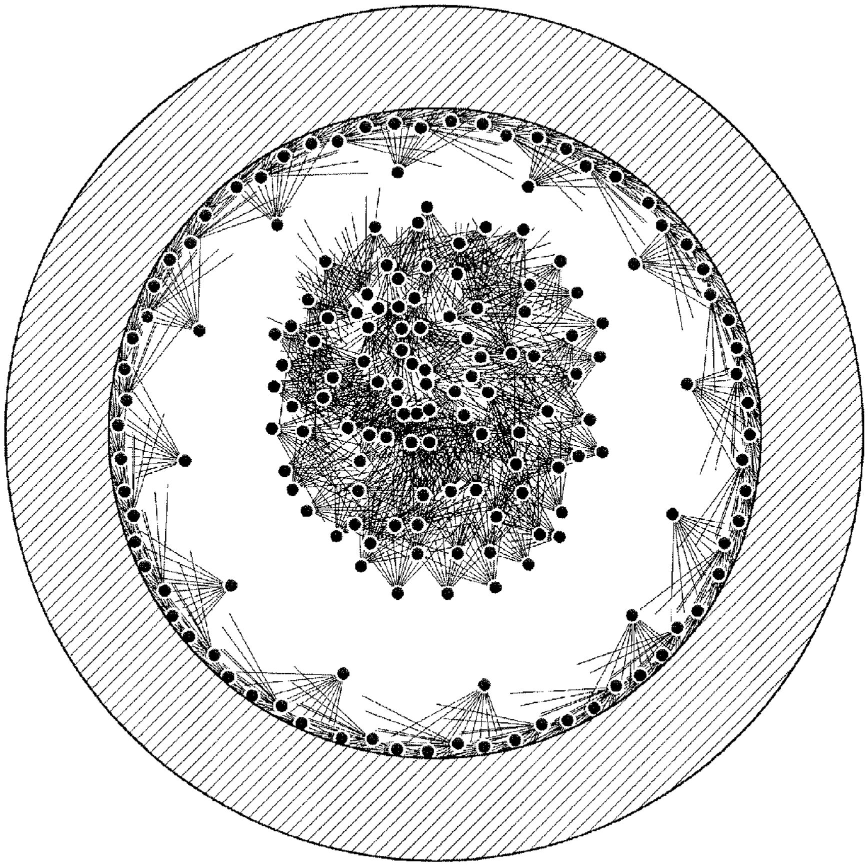
FIG. 13 is a radial cross section of a preferred embodiment of the CPC of the subject invention and depicts a stratum field that concentrates the free electrons paths (black dots) towards the center. The densely dotted area would depict the area of maximum conductivity. The open area would depict resistance. (If you reverse the stratum field, the values for open and densely dotted areas would reverse as well.) In this embodiment, we have employed the static (stratum) magnetic field to draw the recombining molecules (less ionized) towards the walls of the CPC. The densely dotted area depicts the most conductive frictionless plasma near the center of the CPC.
Figure 14:
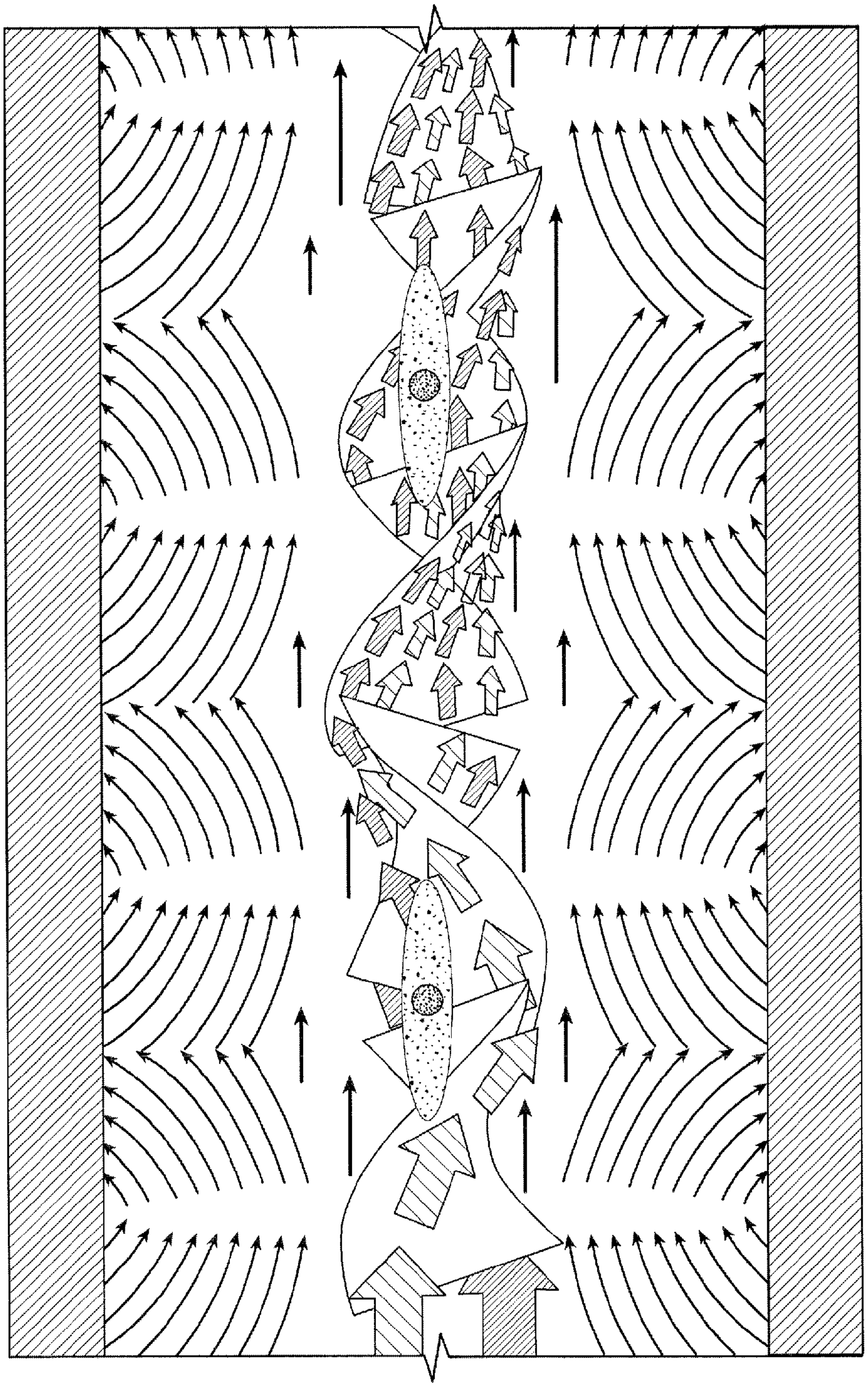
FIG. 14 is an axial cross section of a preferred embodiment of the CPC of the subject invention and depicts the charged particles accelerating through the center of the plasma channel under the influence of both the stratum charge and the perturbation charge. In this embodiment, we maintain the radial static charge from FIG. 13 and also employ the oscillating charge along the wall of the CPC. Path of least resistance meets push/pull. Not shown here, the oscillating charge is recovered at the terminal end.
Figure 15:
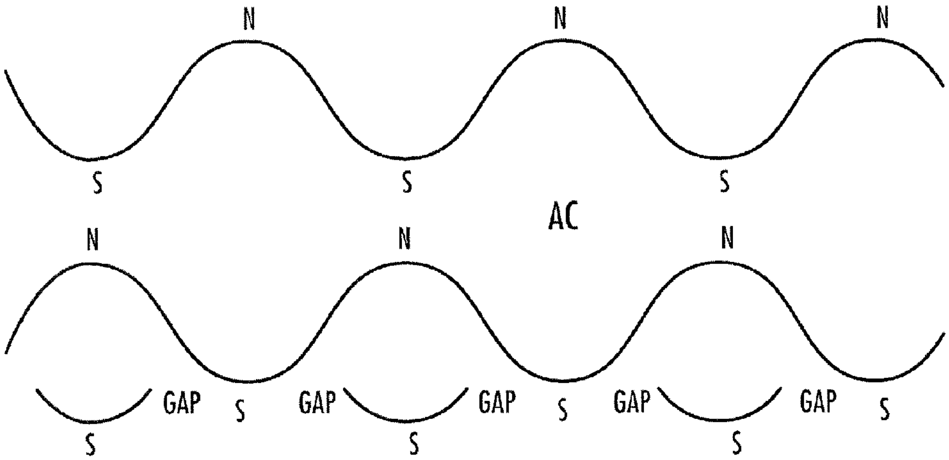
FIG. 15 depicts an oscillating electromagnetic field and the space between it. The top and bottom waves represent adjacent ribbons. "AC" represents an optional alternating current.

Referring once again to FIG. 1 as well as FIG. 8, once the "regionalizing" magnetic field is established within transmission space 18 and the plasma components are separated into axially aligned regions, a current "I" is drawn from power source 52 and passed through conduit 12, perpendicular to the magnetic field "B", creating an electromagnetic force "F" (Lorentz Force) which has both magnitude and direction. For simplicity's sake, the magnetic field "B" is shown between two permanent magnets 54A, 54B rather than the above described magnetic field producing means. The direction of force F is dictated by the directions of magnetic field 8 and current I according to Fleming's left hand rule. The application of the external electromagnetic force, Lorentz force, will stratify and substantially separate the plasma components from one another. Once separated, the applied electromotive force will exploit pathways of free electrons from point to point with little or no resistance. The plasma precursor gas or vapor 100 employed is paramagnetic and will either be attracted to or repelled from the electromagnetic field. The mass/charge ratio is different for the electrons, ions and neutral particles leading to either a greater or lesser attraction to the external field. Thus, each plasma component responds to the force with greater or lesser spatial displacement.

The energy to be transmitted may be introduced into the electron path directly via energy input means in operable communication with transmission space 18 at or near first end portion 12A. In a preferred embodiment, energy input means is comprised of a hyperbolic transmitting electrode 56 inserted into transmission space 18 at first end portion 12A of conduit 12 generally arid into that area of transmission space; 18 occupied by the electron path in particular. Alternatively, when the electron path is adjacent at least a portion of wall 14 the energy may be introduced into the conductive wall 14 itself whereupon it will jump to the path of least resistance, that being the adjacent electron path. The energy to be transmitted is drawn from energy source 52. In one embodiment, energy source 52 may be a transformer or Cockcroft-Walton ("CW", not to be confused with the acronym for "Continuous Wave") generator or "multiplier", which is basically a voltage multiplier that converts AC or pulsing DC electrical power from a low voltage level to a higher DC voltage level. It is made up of a voltage multiplier ladder network of capacitors and diodes to generate high voltages. Unlike transformers, this method eliminates the requirement for the heavy core and the bulk of insulation/potting required. Using only capacitors and diodes, these voltage multipliers can step up relatively low voltages to extremely high values, while at the same time being far lighter and cheaper than transformers. The biggest advantage of such circuits is that the voltage across each stage of the cascade is equal to only twice the peak input voltage, so it has the advantage of requiring relatively low cost components and being easy to insulate. One can also tap the output from any stage, like a multitapped transformer.

In operation, a clean, dry, airtight conduit is provided. The interior of conduit 12 must be scrubbed to eliminate any contaminants that might impede full ionization of the medium. Conduit 12 may be flushed with a so-called "getter" such as Cesium, to eliminate any catalyst. All fluid is evacuated from the transmission space 18 via vacuum system 24. Plasma precursor gas 100 is then extracted from storage unit 22 and introduced into conduit 12 via inlet 20 and pressure verified. A variety of plasma precursor gases or vapors may be employed. For instance, a titanium vapor is particularly well suited because it is an alkaline metal having only one valance electron and is therefore highly reactive. Lithium vapor may also be ideal. Ionizing beam emitting means 28 is activated to generate ionizing beam 30 and ionization is brought to maximum sustainable levels. Power is supplied to any magnetic field generating means that may require it for operation (such as electromagnetic multi-poles, for instance). A potential is applied axially across the transmission space 18, orthogonal to the magnetic flux via transmitting electrode 56 and hyperbolic receiving electrode 58 the latter of which is located at second end 12B of conduit 12. The foci of hyperbolic transmitting and receiving electrodes 56 and 58, respectively, face one another. The ends of both electrodes are inserted into the transmission space 18 a distance from first end 12A and second end 12B sufficient to account for any "end effects" affecting the uniformity of the magnetic field. Once the electromagnetic field is generated separation of the plasma into its component parts occurs producing spatially segregated channels of each component parallel to longitudinal axis 16. High order energy from power source 52 is then introduced into transmission space 18, again via transmitting electrode 56 and is transmitted through the transmission space along at least one segregated electron path having low or no resistance from point-to-point. The energy is received by receiving electrode 58 at end 12B of conduit 12 and in communication with energy recovery means 60 such as a capacitor bank, for instance. Conduit 12 is constantly monitored for leaks during operation.

Auxiliary systems for apparatus 10 are provided. The operation of apparatus 10 is monitored at two control panels located at the ends of the energy transmission line, to which all the required information is provided by probes for ionization levels, vacuum quality installed at several points along conduit 12. Suitable sites for the systems for monitoring, observing, and correcting plasma density will lie at junctions between sections. The system should be protected from extreme events, such as rupture of conduit 12 with loss of vacuum, for which fast vacuum gate valves should be installed at a certain distance along the conduit. For a gate valve response time of under 0:5 sec, and given the time to evacuate all of the energy from the line, the total energy loss should be minimal.

As should now be appreciated, the subject apparatus 10 is a room temperature conductor by design. Apparatus 10 serves as a means for transmitting high order energy from distant energy sources through a modified plasma containing conduit into a load center for further distribution. In the simplest terms, this invention is a bosonic energy carrier in a tube. Because both the magnetic field and the EM field configurations are nearly limitless and varying plasma mediums are conductive to a wide range of charged particles, motions through the tube can be manipulated in useful ways.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

The invention claimed is:

1. A closed plasma channel apparatus, comprising:

a plasma separation chamber comprising a plasma separation vessel having a plasma separation space under vacuum; and a static magnetic field in the plasma separation space, wherein a plasma having a plurality of plasma constituent components positioned in the plasma separation space is substantially separated into a corresponding plurality of regions having a corresponding plurality of conductivities, by the static magnetic field, wherein each plasma constituent component of the plurality of plasma constituent components is substantially positioned in the corresponding region of the plurality of regions, wherein each region of the plurality of regions is parallel to a longitudinal axis of the plasma separation space.

2. The closed plasma channel apparatus of claim 1, wherein the static magnetic field is produced by a close-ended Hallbach cylinder.

3. The closed plasma channel apparatus of claim 1, wherein the plasma separation vessel is a close-ended cylinder having a central longitudinal axis and the static magnetic field in the plasma separation space is produced by a static magnetic field generator, wherein the static magnetic field generator is positioned external to the plasma separation vessel.

4. The closed plasma channel apparatus of claim 3, wherein the static magnetic field generator comprises a plurality of uniformly magnetized rods incrementally spaced around the circumference of the close-ended cylinder, parallel to the central longitudinal axis, wherein substantially all of the rods of the plurality of uniformly magnetized rods have a different cross-sectional direction of magnetization relative to one another.

5. The closed plasma channel apparatus of claim 4, wherein the plurality of uniformly magnetized rods are rotated relative to each other to produce a dynamically variable field and various dipolar configurations within the plasma separation space.

6. The closed plasma channel apparatus of claim 1, further comprising an electromagnetic field generator, wherein the electromagnetic field generator generates an electromagnetic field in the plasma separation space to stimulate movement of particles from a first end of the plasma separation vessel through at least one region of the plurality of regions to a second end of the plasma separation vessel.

7. The closed plasma channel apparatus according to claim 6, further comprising a static magnetic field generator, wherein the static magnetic field in the plasma separation space is generated by the static magnetic field generator.

8. The closed plasma channel apparatus according to claim 1, further comprising an ionizer in operable communication with the plasma separation space, wherein the ionizer ionizes a plasma precursor gas or vapor in the plasma separation space to create the plasma in the plasma separation space.

9. The closed plasma channel apparatus according to claim 8, wherein the ionizer ionizes recombined plasma constituent components and/or non-ionized particles in the plasma separation space in order to sustain a desired plasma density.

10. A method of substantially separating a plasma into a plurality of plasma constituent components, comprising:

providing a plasma separation chamber comprising a plasma separation vessel having a plasma separation space under vacuum;

positioning a plasma having a plurality of plasma constituent components in the plasma separation space; and applying a static magnetic field to the plasma in the plasma separation space so as to substantially separate the plurality of plasma constituent components into a corresponding plurality of regions having a corresponding plurality of conductivities, wherein each region of the plurality of regions substantially has one plasma constituent component of the plurality of plasma constituent components, wherein each region of the plurality of regions is parallel to a longitudinal axis of the plasma separation space.

11. The method according to claim 10, wherein one region of the plurality of regions has a high conductivity relative to the other regions of the plurality of regions.

12. The method of claim 10, further comprising ionizing recombined plasma components and/or non-ionized particles in the plasma separation space in order to sustain a desired plasma density.

13. The method according to claim 12, wherein ionizing recombined plasma components and/or non-ionized particles in the plasma separation space comprises photoionizing recombined plasma components and/or non-ionized particles in the plasma separation space.

14. The method of claim 10, further comprising applying an oscillating electromagnetic field in the plasma separation space, wherein the oscillating electromagnetic field is orthogonal to the static magnetic field, wherein the oscillating electromagnetic field stimulates movement of charged particles along at least one region of the plurality of regions.

15. The method of claim 11, further comprising applying an oscillating electromagnetic field within the plasma separation space, wherein the oscillating electromagnetic field is orthogonal to the static magnetic field, wherein the oscillating electromagnetic field stimulates movement of charged particles along the one region of the plurality of regions.

16. The method of claim 14, further comprising introducing a direct current through the one region of the plurality of regions.

17. The method of claim 15, further comprising introducing a direct current through the one region of the plurality of regions.

18. The method of claim 16, wherein the one region of the plurality of regions is adjacent a conducting wall of the plasma separation vessel, and further comprising introducing an alternating current through the conducting wall, wherein the alternating current passes from the conducting wall to the one region of the plurality of regions and travels axially through the one region of the plurality of regions.

* * * * *